July 31, 1945.  E. R. CARRUTHERS  2,380,415
DUAL WHEEL AND TIRE LIFT
Filed Nov. 10, 1943  2 Sheets-Sheet 1

Inventor
EARL R. CARRUTHERS

By Clarence A. O'Brien
and Harvey B. Jacobson
Attorneys

July 31, 1945.  E. R. CARRUTHERS  2,380,415
DUAL WHEEL AND TIRE LIFT
Filed Nov. 10, 1943   2 Sheets-Sheet 2
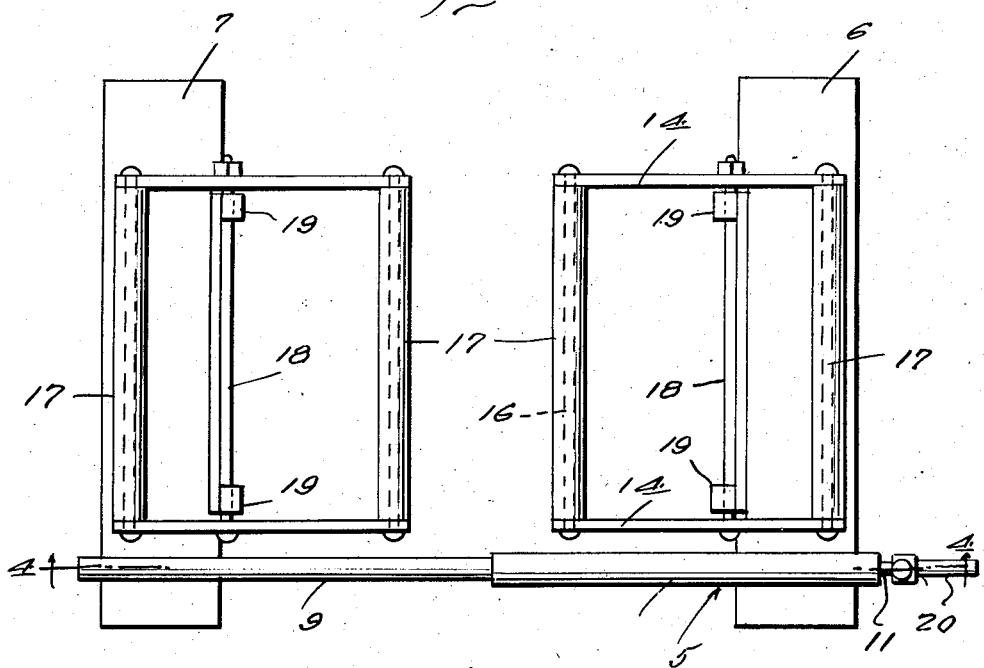
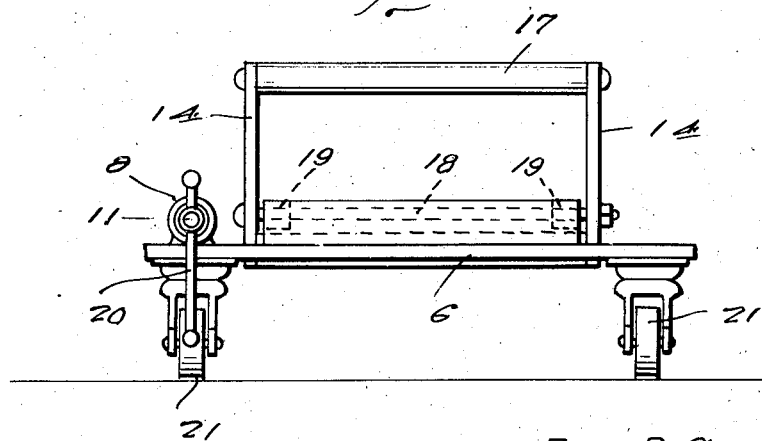
Inventor
EARL R. CARRUTHERS
By *Clarence A. O'Brien and Harvey B. Jacobson*
Attorneys Patented July 31, 1945

2,380,415

UNITED STATES PATENT OFFICE 2,380,415

DUAL WHEEL AND TIRE LIFT

Earl R. Carruthers, Hamilton, Mont.

Application November 10, 1943, Serial No. 509,802

1 Claim. (Cl. 214—664)

This invention relates to new and useful improvements in vehicle wheel trucks, the principal object being to provide a device for the convenient raising, removal and replacement of dual wheels which in many cases are too heavy and cumbersome to be handled by a single man.

Another important object of the invention is to provide a device of the character stated which can be easily manipulated and which is substantially fool-proof in every respect.

Other objects and advantages of the invention will become apparent to the reader of the following description.

In the drawings—

Fig. 2 is a top plan view of the device.

Figure 3 is an end elevational view.

Figure 1:
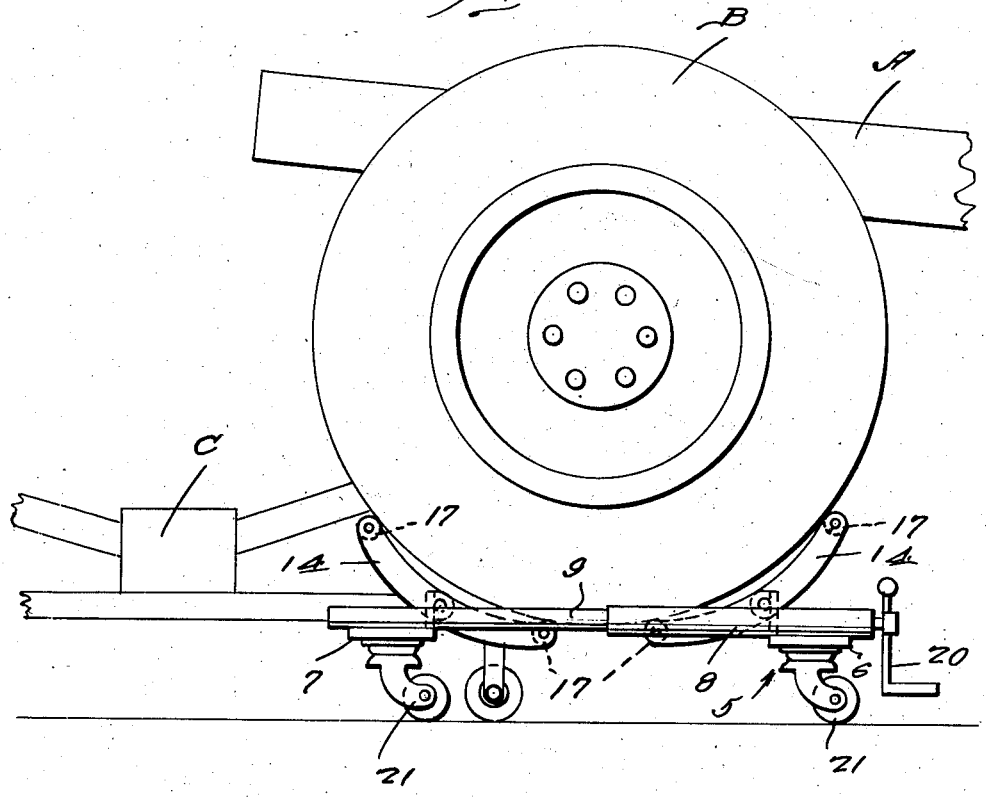
Figure 1 represents a side elevational view of the device shown supporting a wheel.

Referring to the drawings wherein like numerals designate like parts, it can be seen in Figure 1, that reference character A denotes a truck frame, while reference character B denotes a heavy duty tire wheel such as a dual wheel structure, and reference character C denotes a jack for lifting the truck in order that the present invention which is generally referred to by numeral 5 can be placed under the heavy tire and wheel.

Figure 4:
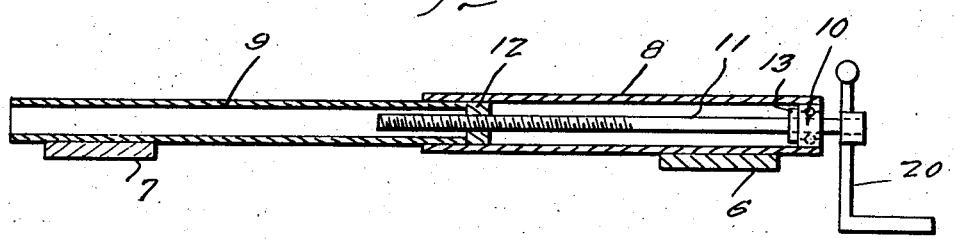
Figure 4 is a longitudinal sectional view taken substantially on the line 4—4 of Figure 2.
Figure 5:
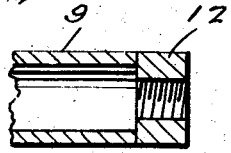
Figure 5 is a fragmentary sectional view showing the inner end of the inner tube.

The device consists of a pair of plates 6, 7, the plate 6 having one end of a tube 8 secured thereto as by welding or the like, while the plate 7 has a tube 9 secured thereto at one end by welding or the like as shown in Figures 2 and 4. The tube 8 telescopes the tube 9 and the tube 8 inside of one end has a bearing 10 through which a screw shaft 11 is disposed, this screw shaft 11 being disposed through an internally threaded nut 12 which is welded or otherwise secured to the adjacent end of the smaller tube 9. It can be seen that the screw shaft 11 is provided with a formation 13 which swivelly limits the same, so that when the shaft 11 is rotated, the threads of the shaft riding in the nut 12 will serve to pull the tube 9 into the tube 8.

Each of the plates 6, 7 carries a rockable cradle and each cradle consists of a pair of arcuate-shaped members 14, 14 connected by rods 16 on which are rollers or sleeves 17. A hinge pin 18 is disposed through the arcuate side members 14, 14 of each cradle and through apertured ears 19 on the corresponding plate 6 or 7.

Obviously, when the jack C has raised the wheel the device 5 can be set under the wheel and the shaft 11 rotated by a crank 20 until the wheel has been sufficiently lifted so that it can be readily pulled off the truck, it being observed that the plates 6, 7 are equipped with caster wheels 21 so that the device can be pulled directly out from the truck for the easy removal of the wheel from the usual stud bolts.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A tire truck comprising a pair of swingable cradle units, tubes projecting from the units, one telescoping the other, and feed means between the tubes, said feed means consisting of the provision of a nut attached to one of the tubes and a threaded shaft disposed through the nut and swivelly connected to the other tube, each cradle unit comprising a pair of opposed arcuate members, and rollers extending between the ends of the members of each pair, each pair of members being pivotally mounted intermediate the ends thereof.

EARL R. CARRUTHERS.